United States Patent [19]
Levitin

[11] Patent Number: 5,916,437
[45] Date of Patent: Jun. 29, 1999

[54] DOMESTIC SEWAGE CLEANING SYSTEM

[76] Inventor: Mikhail Levitin, P.O. Box 102, Reeders, Pa. 18352

[21] Appl. No.: 08/851,174

[22] Filed: May 5, 1997

[51] Int. Cl.$^6$ ....................................................... C02F 1/02
[52] U.S. Cl. ............................ 210/177; 48/197 A; 71/12; 210/180; 210/181; 210/195.2; 210/199; 210/202; 210/218; 210/257.1
[58] Field of Search .............................. 48/197 A; 71/12; 210/804, 177, 180, 181, 195.2, 199, 202, 218, 257.1

[56] References Cited

U.S. PATENT DOCUMENTS

| | | | |
|---|---|---|---|
| 3,383,309 | 5/1968 | Chandler | 210/11 |
| 3,687,646 | 8/1972 | Brent et al. | 48/209 |
| 4,093,516 | 6/1978 | Lang | 426/7 |
| 5,120,435 | 6/1992 | Fink | 210/192 |
| 5,514,282 | 5/1996 | Hibbard et al. | 210/652 |
| 5,679,258 | 10/1997 | Petersen | 210/703 |
| 5,728,305 | 3/1998 | Hawkinson | 210/760 |

Primary Examiner—Peter A. Hruskoci

[57] ABSTRACT

The present invention provides treatment of domestic sewage containing oil. The resulting products will be purified water, dry fertilizer, and fuel (gas and liquid) containing no contaminants that could pollute the environment. After the initial settling process, two parallel flows are created: one containing liquid plus crude sediment (0.2 mm and greater) and the other containing liquid and fine particles (less than 0.2 mm), the latter termed "settled domestic sewage". The two flows are treated separately. The settled domestic sewage after treatment in a low-pressure separator that will separate out liquid fuel, followed by aeration, ultrafiltration, and finally sterilization by ozone or chlorine, results in pure water. The biochemical treatment of the sediments results in the production of gas fuel containing mainly methane gas and solid product that after drying and disinfecting is converted into fertilizer. The system is comprised of a fire chamber and a recuperator which will allow for the utilization of the liquid and gas fuel products to reduce energy expenditures in the cleaning process.

6 Claims, 6 Drawing Sheets

DOMESTIC SEWAGE CLEANING SYSTEM

INTRODUCTION

The present invention relates generally to wastewater cleaning system and more particularly to domestic sewage cleaning system.

BACKGROUND OF THE INVENTION.

The present invention is related to the invention disclosed in U.S. Pat. No. 4,093,516 to Long, issued Jun. 6, 1978, the specification of which is incorporated by reference.

The typical process of cleaning crude sewage involves filtration. The filtration process results in two separate parallel flows, one of which consists of sediment, and the other of filtrate. The filtrate is then aerated by air or oxygen in order to oxidize organic contaminants and is then allowed to settle for a period of time. Formed sediment is mixed with sediment collected after preliminary filtration and then converted into liquid fuel. Settled water from the filtrate is decanted and sterilized with receiving treated water. But, the preliminary filtration and subsequent aeration leads to increasing the concentration of dissolved and fine suspended substances which cannot be separated easily from water in the following steps of cleaning.

In U.S. Pat. No. 5,514,282, to Hibbard et all., issued May 6, 1996, solids contained in wastewater are separated by air flotation by means of adding some coagulators, for example, iron salts and polymeric flocculates. In addition, after the flotation process wastewater is cleaned by multistage filtration using first a fine filter and then an ultrafilter. However, treated water needs additional cleaning before it may be used for domestic consumption because it contains too many dissolved contaminants.

In U.S. Pat. No. 5,120,435, to Fink, issued Jun. 9, 1996, wastewater is treated with preliminary separation from solids. This process results in increasing the concentration of dissolved and fine suspended substances in treated water. Therefore, in previous patents the treated water requires additional complicated cleaning processes before use for domestic consumption.

In conclusion, a need exists for developing an economical and effective domestic sewage cleaning system which produces treated water which is pure enough to be used for domestic consumption.

SUMMARY OF THE INVENTION

The present invention provides treatment of domestic sewage containing oil. The resulting products will be purified water, dry fertilizer, and fuel containing no contaminants that could pollute the environment. In order to accomplish this and other objectives the present invention improves the system for cleaning domestic sewage by initially settling the sewage in the first stage, resulting in the formation of two separate parallel flows: 1. settled domestic sewage and 2. sediment containing solids and liquids heavier than water, for example, urine. More specifically, a preferred embodiment of the present invention includes a settler with an inlet through which raw domestic sewage is introduced, and two outlets through one of which settled domestic sewage is discharged and another through which sediment containing solids and liquids heavier than water is discharged; a low pressure separator for separating the small-sized solid particles and oil drops by flotation with air bubbles generated in the settled domestic sewage when the intake pressure becomes lower than ambient atmospheric pressure; a pump reducing the intake pressure to a vacuum in the low-pressure separator, achieved by draining pretreated domestic sewage formed after treatment in the low-pressure separator; a pre-heater for heating pretreated domestic sewage; an aerator for oxidizing organic compounds contained in the pretreated domestic sewage; an ultrafilter for final cleaning of treated domestic sewage discharged from the aerator, resulting in production of the effluent domestic sewage; a sterilizer of the effluent domestic sewage resulting in the production of pure water; liquid fuel storage tank for keeping liquid fuel produced in the low-pressure separator; a methane tank for the biochemical treatment of the sediment discharged from the settler and low pressure separator, resulting in the production of gas fuel containing mostly methane gas; a gas storage tank for keeping gas fuel discharged from the methane tank; a drying, disinfecting apparatus having a tank with a heater for the disinfecting and drying of solids discharged from the methane tank and the ultrafilter, resulting in the production of solid fertilizer; and condenser for condensing steam produced from the drying, disinfecting apparatus. Thereafter, the condensate formed is discharged into the sterilizer.

The domestic sewage cleaning system can be further comprised of a fire chamber for heating the heaters in the pre-heater and the drying, disinfecting apparatus. The fire chamber can use gas fuel as well as liquid fuel as an energy source. Another embodiment of the present invention includes a recuperator arranged between the pump and the pre-heater for the utilization of the heat coming out of the aerator as well as the heat from the steam condensation coming from the drying, disinfecting apparatus. The above, and other objects, features, and advantages of the present invention will become apparent to persons skilled in the art, from the ensuing description of the preferred embodiment, to be read in conjunction with the accompanying drawings.

DESCRIPTION OF THE DRAWINGS

A detailed description of the preferred embodiment of the invention will be made with reference to the accompanying drawings.

DETAILED DESCRIPTION OF THE EMBODIMENTS

Figure 1:
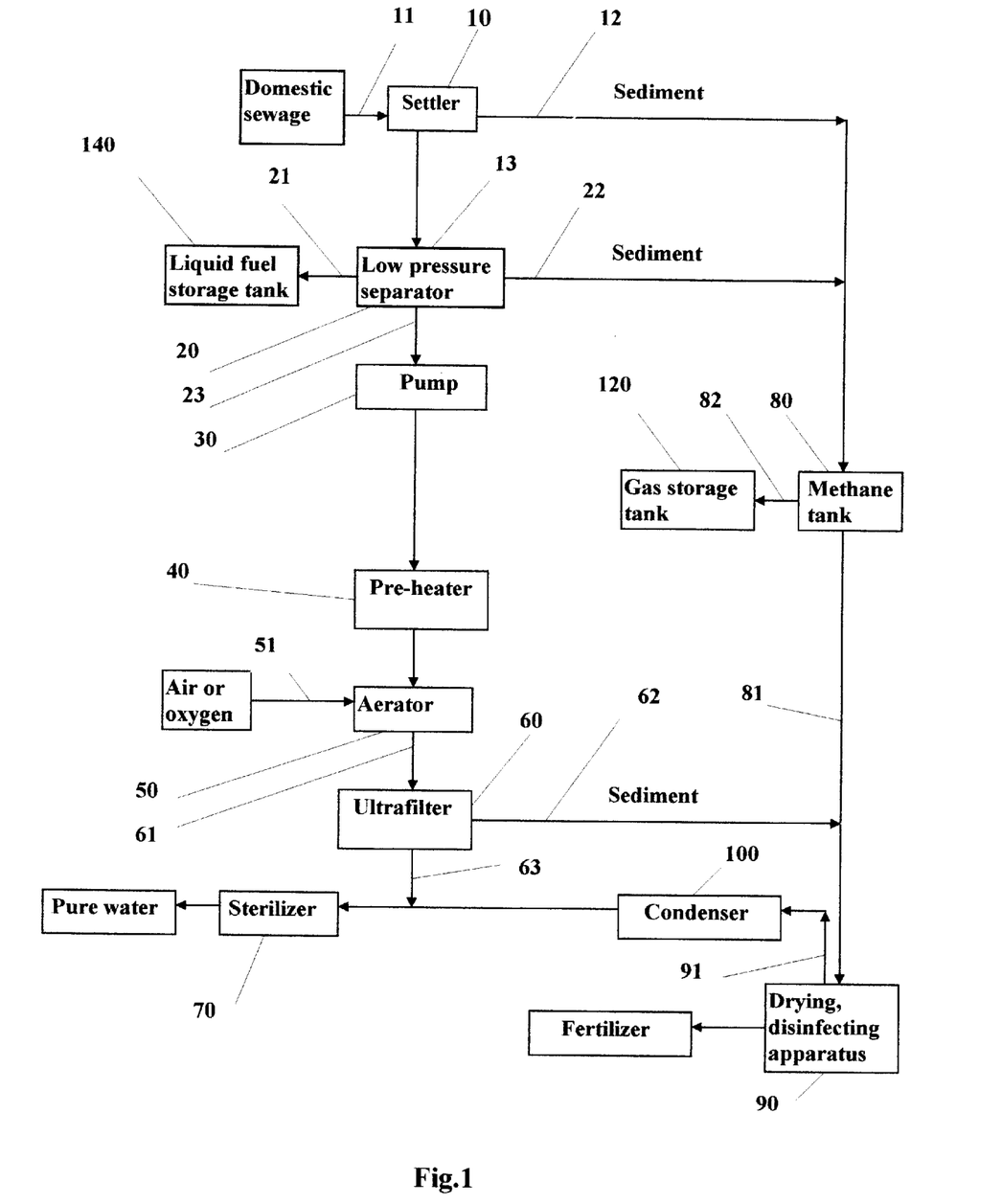
FIG. 1 shows a block diagram of domestic sewage cleaning system in accordance with the first embodiment of the present invention.

As is shown in FIG. 1, domestic sewage is introduced into settler 10 via inlet 11 where the domestic sewage is separated into two flows that are further moved into two separate parallel paths. One flow is formed from settled domestic sewage and the other flow is the sediment containing coarse particles of solids and liquids heavier than water, for example urine. Sediment is discharged into outlet 12 from settler 10 and then into methane tank 80. Settled domestic sewage is discharged into outlet 13 and then into low-pressure separator 20. In the low-pressure separator 20, settled domestic sewage is treated by pressure lower than ambient atmospheric pressure or by vacuum. Under vacuum, air bubbles are formed in the settled domestic sewage. Fine suspended solids and oil drops are separated from settled domestic sewage by flotation with these air bubbles. The fine suspended solids and drops form liquid fuel that is discharged via outlet 21 into liquid fuel storage tank 140. At the bottom of low-pressure separator 20 is formed sediment containing particles of solids that do not settle in the settler 10. This sediment is discharged from low-pressure separator 20 through outlet 22 and mixed with the sediment from settler 10. After elimination of liquid fuel and sediment from domestic sewage the result is pretreated domestic sewage. Pump 30 drains pretreated domestic sewage from low-pressure separator 20 into outlet 23 simultaneously creating a vacuum in the low-pressure separator 20. Pretreated domestic sewage is introduced into the pre-heater 40 for heating up to temperature 85° F.–115° F. Then heated pretreated domestic sewage is introduced into aerator 50 for treatment by oxygen or air. After oxidation, dissolved and fine suspended organic substances contained in heated pretreated domestic sewage form fine suspended solids that are discharged from ultrafilter 60 into outlet 62. After cleaning in ultrafilter 60, from these fine suspended solids heated pretreated domestic sewage is formed effluent domestic sewage that is discharged from the ultrafilter 60 into outlet 63 and then into sterilizer 70. Effluent domestic sewage in the sterilizer 70 is disinfected by one of existing methods, for example, by chlorination or ozonization, and forms pure water. That is to say, the treatment of settled domestic sewage in the above system results in pure water that can be used by the consumer.

The second flow is formed by mixing sediment from settler 10 and sediment from low-pressure separator 20. This flow is introduced into methane tank 80. Gas fuel, containing mostly methane gas, and solids are formed in methane tank 80 during the biochemical treatment of the mixture containing sediments from settler 10 and low-pressure separator 20. Gas fuel is introduced via outlet 82 into gas storage tank 120. Solids from methane tank 80 are mixed with solids from the ultrafilter 60 and introduced into the drying, disinfecting apparatus 90. After heating up to temperature 175° F.–210° F. this mixture of sediments is disinfected and changed into fertilizer. Steam from the drying, disinfecting apparatus 90 is introduced into the condenser 100 via outlet 91 where it is converted into water. This water is mixed with effluent domestic sewage and introduced into sterilizer 70 for disinfecting. Dry powder fertilizer is packed up before shipping.

Therefore, the above-described domestic sewage cleaning system provides treatment of domestic sewage containing oil that results in the production of pure water and fertilizer containing no contaminants that could pollute the environment. The system is simple and reliable in operation and requires equipment with a smaller volume in comparison to known systems because 85% of contaminants are removed from domestic sewage in the first stage of treatment. Additional cleaning of the settled domestic sewage is more effective and easier than in known similar systems.

Figure 2:
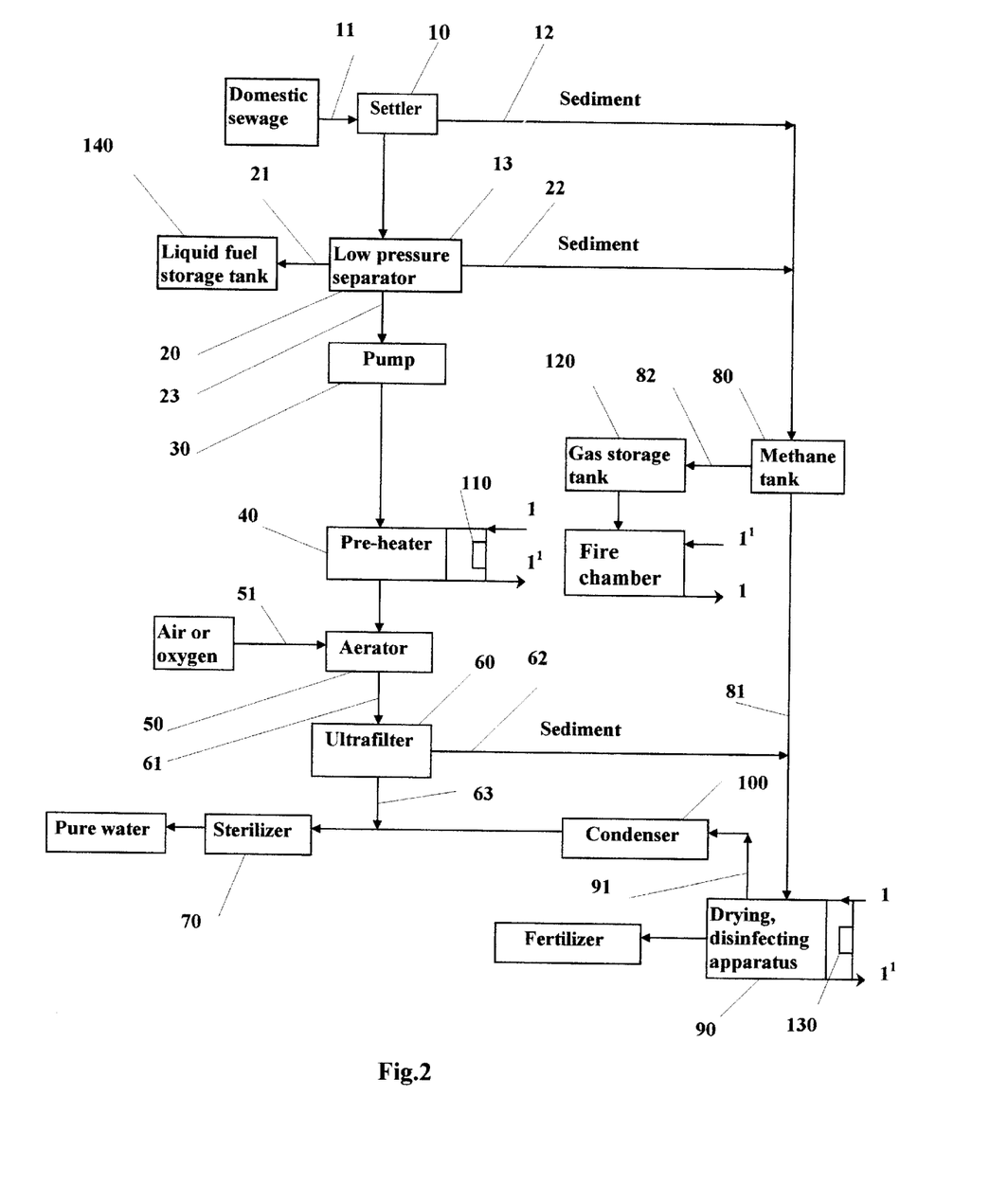
FIG. 2 shows a block diagram of domestic sewage cleaning system in accordance with FIG. 1, further comprised of a fire chamber running on gas fuel.

FIG. 2 shows a block diagram of domestic sewage cleaning system in accordance with FIG. 1, further comprised of a fire chamber running on gas fuel. Heat from the combustion products of gas fuel provides the energy for the functioning of heater 110 in pre-heater 40 and heater 130 in the drying, disinfecting apparatus 90. These combustion products are introduced into heaters 110 and 130 through pipe 1 and drained through pipe $1^1$. By utilizing heat from the combustion products of gas fuel, it is possible to decrease or completely eliminate consumption of fuel from outside sources in the above-described system.

Figure 3:
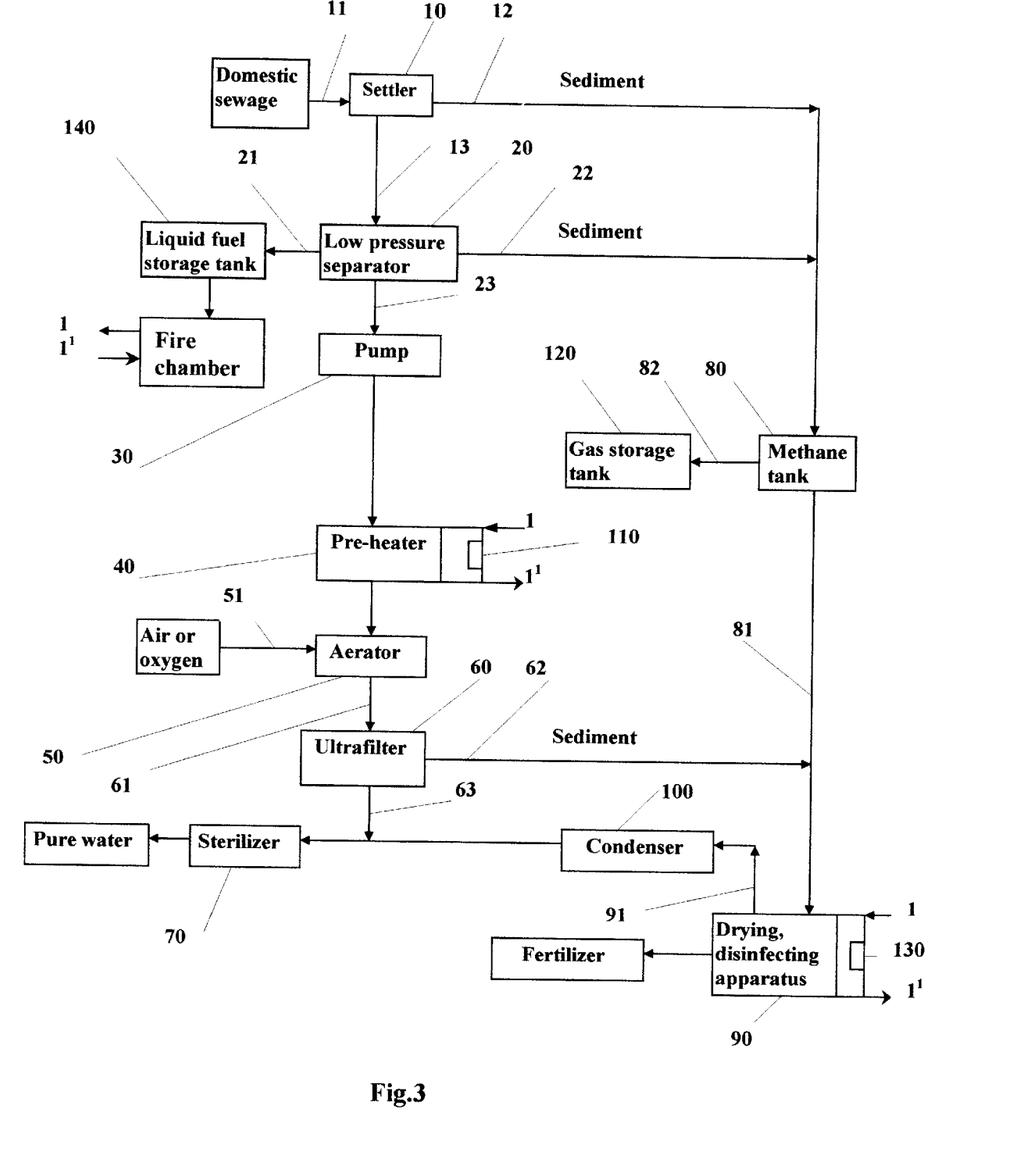
FIG. 3 shows a block diagram of domestic sewage cleaning system in accordance with FIG. 1, further comprised of a fire chamber running on liquid fuel.

FIG. 3 shows a block diagram of the domestic sewage cleaning system in accordance with FIG. 1, further comprised of a fire chamber running on liquid fuel. Heat from combustion products of liquid fuel provides functioning of heater 110 in pre-heater 40 and heater 130 in the drying, disinfecting apparatus 90. The utilization of heat from the combustion products of liquid fuel makes possible the decrease or complete elimination of consumption of fuel from outside sources in the above-described system.

Figure 4:
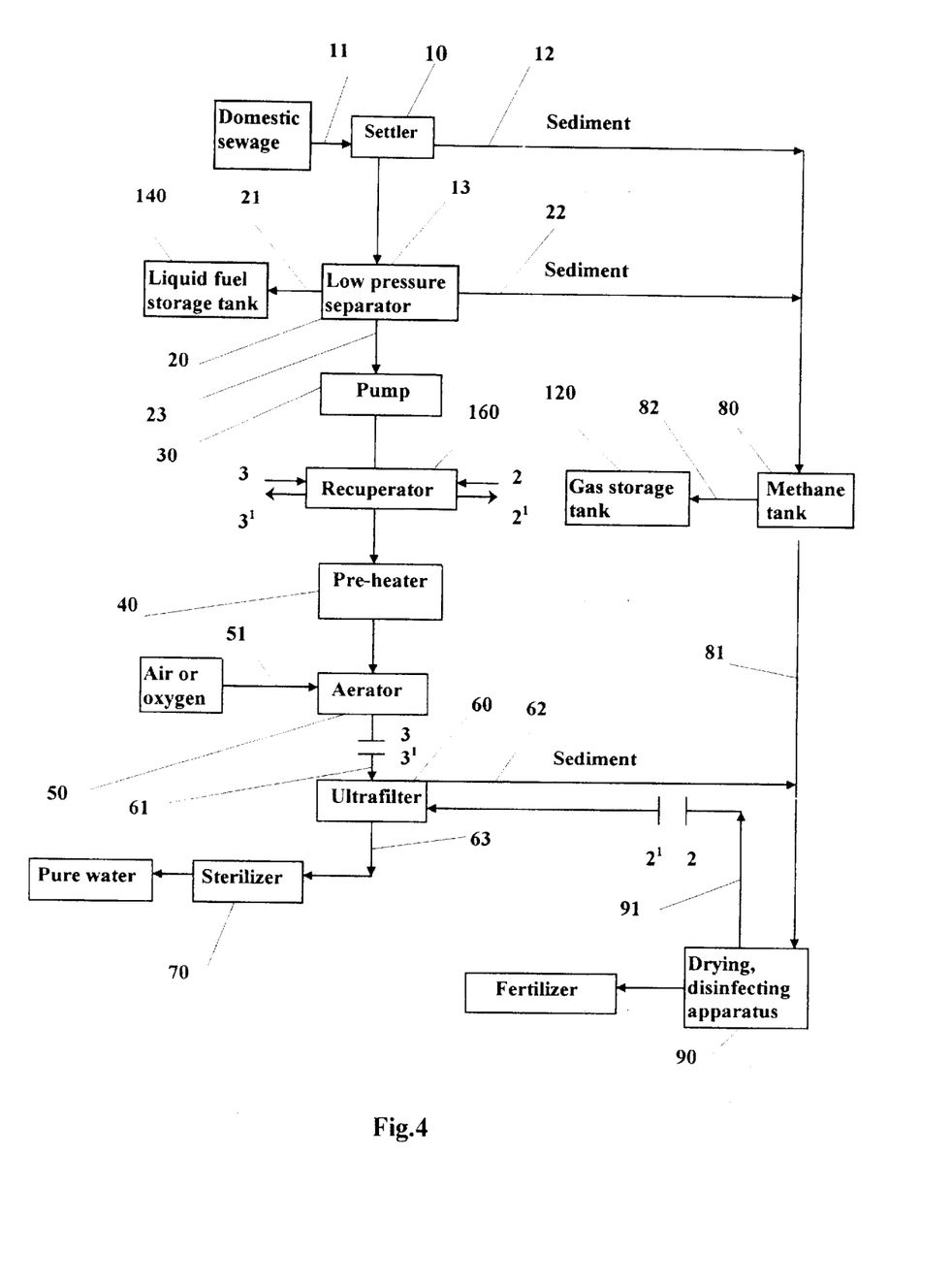
FIG. 4 shows a block diagram of domestic sewage cleaning system in accordance with the second embodiment of the present invention.

As is shown in FIG. 4, according to the second embodiment of the present invention, domestic sewage is introduced into settler 10 via inlet 11 where the domestic sewage is separated into two flows that continue along two parallel separate paths. One flow is formed from settled domestic sewage; another flow is sediment containing coarse particles of solids and liquids heavier than water, for example urine. Sediment is discharged from settler 10 into outlet 12 and then into methane tank 80. Settled domestic sewage is discharged into outlet 13 and then into low-pressure separator 20. In the low-pressure separator 20 settled domestic sewage is treated by vacuum. Under low pressure, air bubbles are formed in the settled domestic sewage. Fine suspended solids and oil drops are separated from settled domestic sewage by flotation with these air bubbles. These fine suspended solids and oil drops form liquid fuel that is discharged via outlet 21 into liquid fuel storage tank 140. At the bottom of low-pressure separator 20 is formed sediment containing particles of solids that do not settle in the settler 10. This sediment is discharged from low-pressure separator 20 into outlet 22 and mixed with sediment from settler 10. After elimination of liquid fuel and sediment from settled domestic sewage the result is pretreated domestic sewage. Pump 30 drains pretreated domestic sewage from low-pressure separator 20 into outlet 23, simultaneously creating a vacuum in low-pressure separator 20. Pretreated domestic sewage is introduced into recuperator 160 including three channels each with an inlet and outlet for ongoing heat exchange between flows, wherein an inlet of a first channel is connected with the outlet of the pump for the flow of said pretreated domestic sewage. Pretreated domestic sewage initially is heated in the recuperator 160 using heat from treated domestic sewage after treatment in aerator 50, as well as heat of the steam discharged from the drying, disinfecting apparatus 90. Treated domestic sewage is introduced into recuperator 160 from aerator 50 through a second channel including inlet pipe 3 and is drained from recuperator 160 into ultrafilter 60 by outlet pipe $3^1$. Steam from drying, disinfecting apparatus 90 is introduced into recuperator 160. Then, after condensation, the formed condensate is drained into a third channel including inlet pipe 2 and formed condensate is drained into sterilizer 70 by outlet pipe $2^1$. Drained from recuperator 160, pretreated domestic sewage is introduced into pre-heater 40 for heating up to temperature 85° F.–115° F. by heater 110. Then heated pretreated domestic sewage is introduced into aerator 50 for treatment by oxygen or air. After oxidizing by oxygen or air, dissolved and fine suspended organic substances contained in heated pretreated domestic sewage form fine-suspended solids that are discharged from ultrafilter 60 into outlet 62. Cleaned in the ultrafilter 60 the oxidized domestic sewage forms effluent domestic sewage that is discharged from ultrafilter 60 into outlet 63 and then into sterilizer 70. Effluent domestic sewage is disinfected in sterilizer 70 by one of known methods, for example, by chlorination or ozonization and forms pure water.

Therefore, the treatment of the settled domestic sewage in the above system results in pure water that can be used by the consumer. In addition, utilization of the heat of the treated domestic sewage from aerator 50, as well as of heat of steam from the drying, disinfecting apparatus 90 reduces the consumption of fuel required for the functioning of the system.

The second flow is formed by mixing the sediment from settler 10 and the sediment from low-pressure separator 20. This flow is introduced in methane tank 80. Gas fuel, containing mostly methane gas, and solids are formed in methane tank 80 during the biochemical treatment of the mixture containing sediments from settler 10 and low-pressure separator 20. Gas fuel is introduced into outlet 82 and then into gas storage tank 120. Solids from methane tank 80 are mixed with solids from ultrafilter 60 and introduced into the drying, disinfecting apparatus 90. By heating up to a temperature between 175° F.–210° F. this mixture of the sediments is disinfected and changed into fertilizer. Dry powder of the fertilizer is packed before shipping. Steam from pipe 2 is introduced into recuperator 160. In recuperator 160 steam is condensed and the formed condensate is introduced into pipe $2^1$ for mixing with the effluent domestic sewage before it is channeled into sterilizer 70. Heat from the condensation of steam is used for heating the pretreated domestic sewage.

Therefore, the offered domestic sewage cleaning system provides treatment of the domestic sewage containing oil that results in the production of pure water and fertilizer that contain no contaminants which could pollute the environment. The system is simple and reliable in operation and requires equipment with smaller volume in comparison to known similar systems because about 85% of the contaminants are removed from the domestic sewage in the first stage of the treatment. Additional cleaning of the settled domestic sewage is more effective and easier than in known similar systems. In addition, recuperation of the heat of the treated domestic sewage as well as of heat from condensation of the steam from the drying, disinfecting apparatus decreases the consumption of energy required from outside sources for the functioning of the system.

Figure 5:
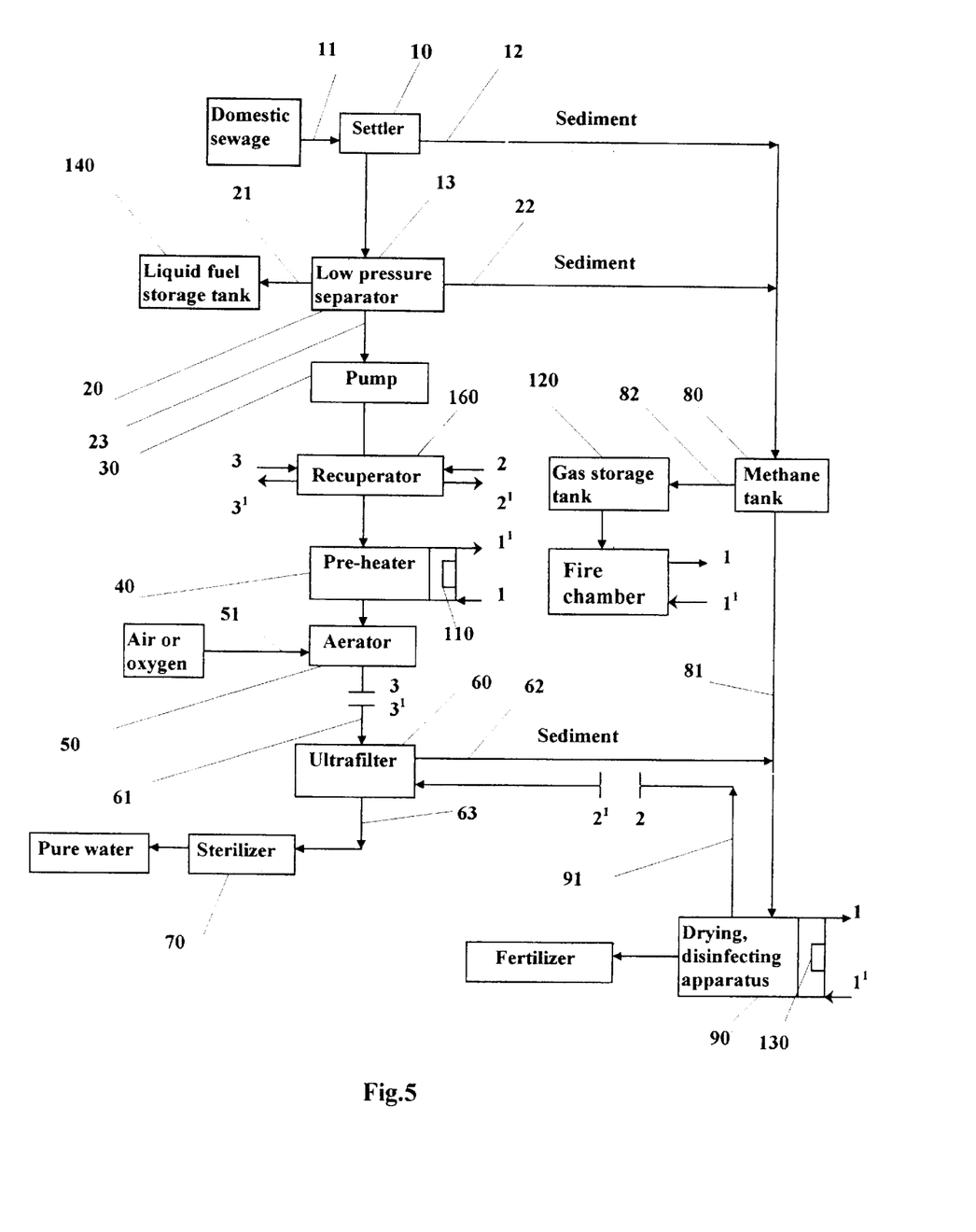
FIG. 5 shows a block diagram of domestic sewage cleaning system in accordance with FIG. 4, further comprised of a fire chamber running on gas fuel.

FIG. 5 shows a block diagram of the domestic sewage cleaning system in accordance with FIG. 4, further comprised of a fire chamber running on gas fuel. Heat from the combustion products of the gas fuel provides functioning of heater 110 in pre-heater 40 and heater 130 in the drying, disinfecting apparatus 90 that makes possible decreasing or completely eliminating the consumption of fuel from outside sources in the offered system.

Figure 6:
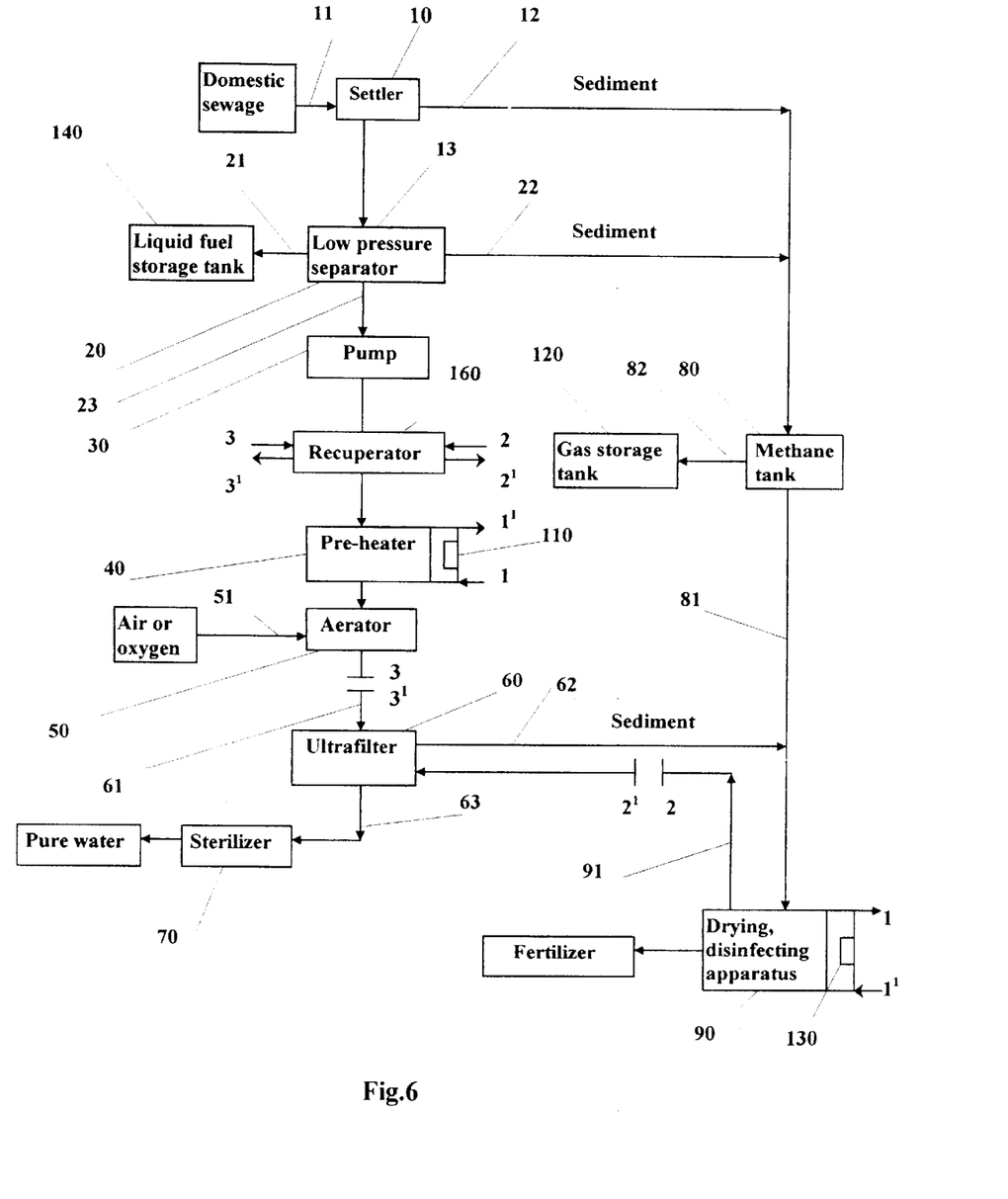
FIG. 6 shows a block diagram of domestic sewage cleaning system in accordance with FIG. 4, further comprised of a fire chamber running on liquid fuel.

FIG. 6 shows a block diagram of the domestic sewage cleaning system in accordance with FIG. 4, further comprised of a fire chamber running on liquid fuel. Heat from the combustion products of the liquid fuel provides functioning of heater 110 in pre-heater 40 and heater 130 in the drying, disinfecting apparatus 90 that makes possible decreasing or completely eliminating the consumption of fuel from outside sources in the offered system.

Although the present invention has been described in terms of the preferred embodiments above, numerous modifications and/or additions to the above-described preferred embodiments would be readily apparent to one skilled in the art. It is intended that the scope of the present invention extends to all such modifications and/or additions and that the scope of the present invention is limited solely by the claims set forth below.

I claim:

1. Domestic sewage cleaning system for sewage contaminated with oil that is comprised of:

a settler, including an inlet through which said domestic sewage is introduced in said settler to provide the cleaning of said domestic sewage from coarse solid particles and liquids heavier than water by means of gravity, and two outlets, through one of which formed settled domestic sewage containing fine suspended solids and oil is discharged and through another, sediment consisting of coarse solid particles and liquids heavier than water is discharged;

a low-pressure separator, including an inlet through which said settled domestic sewage is introduced from said settler to separate fine suspended solids and oil by flotation with small air bubbles formed in said settled domestic sewage by vacuum, and three outlets, through one of which is discharged sediment accumulated at the bottom part of said low-pressure separator, through a second of which outlet is discharged liquid fuel consisting of a mixture of floated said oil and said fine suspended solid particles that accumulated at the upper part of said low-pressure separator, through a third of which outlet, formed pretreated domestic sewage, cleaned from said liquid fuel and said sediment, is discharged;

a liquid fuel storage tank for keeping said liquid fuel introduced from said low-pressure separator;

a pump for forming a vacuum in said low-pressure separator, by means of draining said pretreated domestic sewage that is discharged through an outlet;

a pre-heater having a tank for said pretreated domestic sewage introduced from said outlet of said pump and a heater for heating said pretreated domestic sewage present in said tank;

an aerator comprised of two inlets, through one of which after heating, said pretreated domestic sewage is introduced from said pre-heater, through another said inlet, air or oxygen is introduced for oxidation of dissolved and fine suspended solid organic substances present in said heated pretreated domestic sewage, and an outlet through which formed treated domestic sewage is discharged;

an ultrafilter comprised of an inlet through which said treated domestic sewage is introduced after oxidation in said aerator, and two outlets through one of which after having been filtered, solids are discharged, and through another, formed effluent domestic sewage is discharged;

a sterilizer, comprised of an inlet and an outlet, in which said effluent domestic sewage introduced from said ultrafilter is sterilized for forming after sterilization, pure water that can be discharged and utilized by the consumer;

a methane tank comprised of an inlet through which said sediment from said settler and said low-pressure separator is introduced for biochemical treatment, resulting in the production of gas fuel containing methane gas, and solid product, each discharged from said methane tank in two separate outlets;

a gas storage tank for keeping said gas fuel introduced from said methane tank;

a drying, disinfecting apparatus having a tank with a heater in which said solid product from said methane tank and said solids from said ultrafilter are introduced through an inlet for disinfecting and drying, resulting in the production of dry solid fertilizer and steam, each discharged to two separate outlets;

a condenser with an inlet through which said steam, to be condensed, is introduced from said drying, disinfecting apparatus, and an outlet for discharging formed condensate into the inlet of said sterilizer.

2. Domestic sewage cleaning system for sewage contaminated by oil as claimed in claim 1, further comprised of a fire chamber arranged between the gas storage tank and the heaters of the pre-heater and the drying, disinfecting apparatus.

3. Domestic sewage cleaning system for sewage contaminated by oil as claimed in claim 1, further comprised of a fire chamber arranged between the liquid fuel storage tank and the heaters of the pre-heater and the drying, disinfecting apparatus.

4. Domestic sewage cleaning system for sewage contaminated by oil, that is comprised of:

a settler, including an inlet through which said domestic sewage is introduced into said settler to provide the cleaning of said domestic sewage from coarse solid particles and liquids heavier than water by gravity, and two outlets, through one of which settled domestic sewage containing fine suspended solids and oil is discharged, and through another of which outlet, sediment consisting of coarse solid particles and liquids heavier than water is discharged;

a low-pressure separator, including an inlet through which said settled domestic sewage is introduced from said settler to separate fine-suspended solids and oil by flotation with small air bubbles formed in said settled domestic sewage by vacuum, and three outlets, through one of which are discharged sediment accumulated at the bottom part of said low-pressure separator, through a second of which outlet, liquid fuel consisting of a mixture of said floated oil and said fine-suspended solid particles, which accumulated at the upper part of said low-pressure separator, is discharged, and through a third of which outlet, formed pretreated domestic sewage, cleaned from said liquid fuel and sediment is discharged;

a liquid fuel storage tank for keeping liquid fuel introduced from said low-pressure separator;

a pump for forming a vacuum in said low-pressure separator by draining said pretreated domestic sewage, which is discharged through an outlet;

a recuperator including three channels each with an inlet and an outlet for ongoing heat exchange between the flows, wherein an inlet from a first channel is connected with said outlet of said pump for the flow of said pretreated domestic sewage;

a pre-heater having a tank for said pretreated domestic sewage introduced from said outlet of said recuperator, and a heater for heating said pretreated domestic sewage present in said tank;

an aerator, including two inlets, through one of which heated pretreated domestic sewage is introduced from said pre-heater, and through another of which, air or oxygen is introduced for oxidation of dissolved and fine suspended solid organic substances present in said heated pretreated domestic sewage, and an outlet, connected with an inlet of a second channel of said recuperator, through which formed treated domestic sewage is discharged;

an ultrafilter, comprised of an inlet through which said treated domestic sewage is introduced after oxidation in said aerator, two outlets, through one of which filtered solids are discharged, and through another of which formed effluent domestic sewage is discharged;

a sterilizer, comprised of an inlet and an outlet, in which said effluent domestic sewage introduced from said ultrafilter is sterilized for forming after sterilization, pure water, which can be utilized by the consumer after being discharged from the outlet;

a methane tank, comprised of an inlet through which said sediment from said settler and said sediment from said low-pressure separator are introduced for biochemical treatment, resulting in production of gas fuel, containing methane gas, and solid product, each discharged from said methane tank into two separate outlets;

a gas storage tank for keeping said gas introduced from said methane tank;

a drying, disinfecting apparatus having a tank with a heater in which said solid product from said methane tank and said solids from said ultrafilter are introduced through an inlet for drying and disinfecting, resulting in production of dry solid fertilizer, discharged through one outlet to the storage tank containing ready product, and steam, discharged into another outlet connected with an inlet of a third channel of said recuperator, and said third channel of said recuperator is connected with an inlet of said sterilizer.

5. Domestic sewage cleaning system for sewage contaminated with oil as claimed in claim 4, further comprised of a fire chamber arranged between the gas storage tank and the pre-heater and the drying, disinfecting apparatus.

6. Domestic sewage cleaning system for sewage contaminated with oil as claimed in claim 4, further comprised of a fire chamber arranged between the liquid fuel storage tank and the heaters of the pre-heater and the drying, disinfecting apparatus.

* * * * *